United States Patent [19]
Kato

[11] 4,093,362
[45] June 6, 1978

[54] PINCH ROLLER MOVING DEVICES FOR SIMULTANEOUS IMAGE AND SOUND RECORDING CINECAMERAS

[75] Inventor: Masakathu Kato, Nagoya, Japan
[73] Assignee: Elmo Company, Limited, Nagoya, Japan
[21] Appl. No.: 777,078
[22] Filed: Mar. 14, 1977
[30] Foreign Application Priority Data
  Mar. 15, 1976  Japan .......................... 51/031373[U]
[51] Int. Cl.² ........................................... G03B 31/02
[52] U.S. Cl. ......................................... 352/27; 352/72
[58] Field of Search ................................... 352/27, 72
[56] References Cited
U.S. PATENT DOCUMENTS

| 4,000,940 | 1/1977 | Komine | 352/27 |
| 4,027,955 | 6/1977 | Reichen | 352/27 |
| 4,037,947 | 7/1977 | Freudenschuss | 352/27 |
| 4,052,125 | 10/1977 | Ishibashi | 352/27 |

Primary Examiner—Monroe H. Hayes
Attorney, Agent, or Firm—Dennison, Dennison, Meserole & Pollack

[57] ABSTRACT

Disclosed is an improved pinch roller moving device for a simultaneous image and sound recording cinecamera. The device includes a first lever on which the pinch roller is supported rotatably and transversely movably and a second lever rotatable to rotate the first lever to press the pinch roller against a capstan. A cam is provided to rotate the second lever and a third lever is provided to hold the first lever against rotation. The third lever is rotatable upon rotation of a second cam to release the first lever for rotation. A fourth lever is provided for maintaining the second lever in its rotated position. The device further includes means for transmitting rotation of a capstan driving motor to the cams. This motor is operable upon depression of a release button on the cinecamera.

13 Claims, 4 Drawing Figures

PINCH ROLLER MOVING DEVICES FOR SIMULTANEOUS IMAGE AND SOUND RECORDING CINECAMERAS

This invention relates to a device for pressing a pinch roller against a capstan in a simultaneous image and sound recording cinecamera using a film having a magnetic sound recording zone along one longitudinal edge thereof. More particularly, this invention is concerned with such a device utilizing for its operation the rotation of an electric motor for driving the capstan.

Nowadays, it is common in the field of an 8 mm motion picture to use a film coated with magnetic powder along one longitudinal edge thereof to permit simultaneous recording of images and sound. In a cinecamera adapted for use with such a film, the film is advanced intermittently to record a series of images, while it is caused to travel at a constant speed for recording sound. The constant movement of the film for sound recording is usually achieved by a capstan rotating at a constant speed and a pinch roller pressing the film against the capstan. If the pinch roller is maintained in pressure contact with the capstan for a long time when the capstan is stationary, the pinch roller is liable to undesirable distortion. In order to avoid this possibility, the movement of the pinch roller into pressure contact with the capstan is usually operationally associated with the depression of a release button on the cinecamera. The pinch roller must, however, be moved into contact with the capstan against the action of a spring provided to normally maintain the pinch roller in its inoperative position away from the capstan. A very large force is required to depress the release button or keep it in its depressed position by overcoming the force of the spring.

In view of the aforementioned inconvenience of the prior art, it is an object of this invention to provide a novel and improved device for pressing a pinch roller against a capstan in a cinecamera of the type described, which device is easy to operate with only a minor amount of force.

This object is attained by this invention which provides a pinch roller moving device for a simultaneous image and sound recording cinecamera having a capstan, a pinch roller movable into contact with the capstan to advance continuously a film having a sound recording track along one longitudinal edge thereof, means for driving the film intermittently, an electric motor for driving the capstan and an electric motor for driving the intermittent film driving means, the device comprising:

a rotatable lever on which the pinch roller is rotatably and transversely movably supported;
rotary means rotatable upon rotation of the capstan driving motor; and
means for transmitting the rotation of the capstan driving motor to the rotary means to rotate the lever to move the pinch roller transversely to press the film against the capstan;
the capstan driving motor being actuatable upon depression of a cinecamera release button.

According to a preferred embodiment of this invention, the rotary means comprises a specially shaped cam which is rotatable upon actuation of the capstan driving motor to allow the pinch roller supporting lever to rotate and move the pinch roller transversely into contact with the capstan, and which ceases rotation upon such transverse movement of the pinch roller. The preferred embodiment further includes another lever rotatably supported on a shaft on which the pinch roller supporting lever is supported. Normally, this lever resiliently holds the pinch roller supporting lever in its inoperative position in which the pinch roller is spaced away from the capstan, but is rotatable, upon rotation of the aforementioned cam, into its operative position in which it resiliently maintains the pinch roller supporting lever in its operative position in which the pinch roller is maintained in contact with the capstan. The preferred embodiment further includes a latching lever which is resiliently rotatable into its operative position in which it maintains the second mentioned lever in its operative position against the resilient force acting on the lever, and an electromagnet which is energizable upon discontinuation of depression of the cinecamera release button to pull back the latching lever into its inoperative position to return the first and second mentioned levers into their respective inoperative positions, whereby the pinch roller is moved away from the capstan. This electromagnet is energizable simultaneously with the energization of another electromagnet that is energizable upon discontinution of such release button depression to actuate a shutter stop to stop a shutter at a predetermined position.

According to the device of this invention, only a very small force is required to depress the release button in order to place the pinch roller in its operative position relative to the capstan, because the resilient force acting to maintain the pinch roller in its inoperative position is effectively overcome by the aforementioned mechanism operable by utilizing the rotary motion of the capstan driving motor. The cinecamera incorporating the device of this invention is advantageously capable of starting simultaneous image and sound recording satisfactorily without any appreciable delay after depression of the release button, because a flywheel on which the capstan is coaxially supported can be placed in full rotation prior to the beginning of film advancement by the capstan and the pinch roller, so that there is virtually no disuniformity in the speed of rotation of the capstan otherwise possible due to the inertia of the flywheel during the beginning of the film advancement.

Other objects and advantages of this invention will become apparent from the following detailed description of its preferred embodiment and the accompanying drawings, in which.

The invention will now be described in further detail by way of example with reference to the accompanying drawings.

Figure 1:
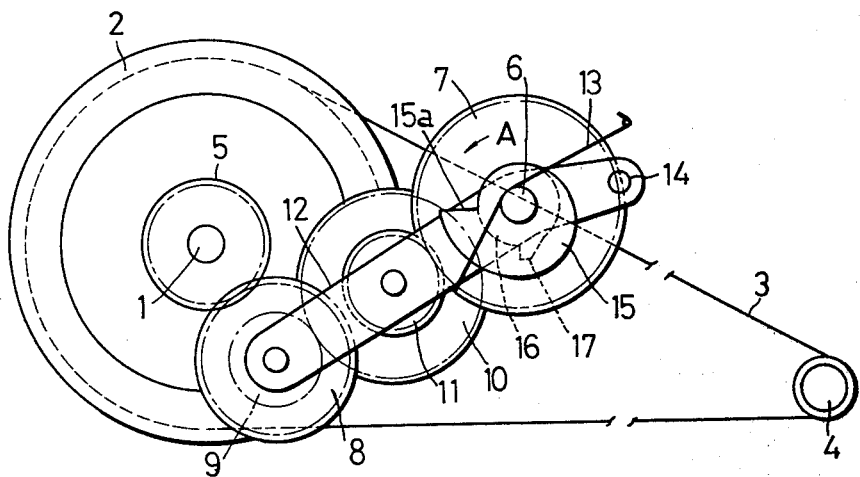
FIG. 1 is a fragmentary, enlarged front elevational view of the preferred embodiment of this invention.

Referring to FIG. 1 of the drawings, a capstan 1 adapted to advance a film 18 (FIGS. 2 and 3) at a constant speed is mounted coaxially with a flywheel 2 having a large moment of inertia. An endless belt 3 extends around the flywheel 2 and a pulley 4 secured to the output shaft of a capstan driving motor 43 (FIG. 4) to transmit rotation from the capstan driving motor 43 to the flywheel 2. A toothed wheel 5 is secured to the flywheel 2 coaxially with the capstan 1 and is rotatable with the flywheel 2. A toothed wheel 7 is rotatably supported on a shaft 6. A lever 12 is rotatably supported on the shaft 6. A spring 13 extends past the shaft 6 and has one end appropriately secured to a cinecamera casing. The spring 13 has another end engaged with the lever 12 to urge it in a clockwise direction as viewed in FIG. 1. A toothed wheel 8, which is somewhat greater in diameter than the toothed wheel 5 on the flywheel 2, is rotatably supported on one end of the lever 12 and is engageable with the toothed wheel 5 as shown in FIG. 1. The toothed wheel 8 is provided with an integral toothed wheel 9 of smaller diameter rotatably supported on the lever 12 coaxially with the toothed wheel 8. A toothed wheel 10 is rotatably supported on the lever 12 between the one end of the lever 12 and the shaft 6. The toothed wheel 10 has a somewhat greater diameter tham the toothed wheel 8 and is engaged with the toothed wheel 9. The toothed wheel 10 includes an integral and coaxial toothed wheel 11 of smaller diameter rotatably supported on the lever 12 and engaged with the toothed wheel 7 on the shaft 6. The toothed wheel 7 is somewhat greater in diameter than the toothed wheel 10. Thus, when the toothed wheel 8 is engaged with the toothed wheel 5, the rotation of the capstan driving motor 43 is transmitted to the toothed wheel 7 with progressive reduction in speed through the toothed wheels 5, 8, 9, 10 and 11. The lever 12 is provided with a pin 14 at another end thereof to the opposite side of the shaft 6 from the toothed wheel 8. Two cams 15 and 16 are rotatably carried on the shaft 6 and are rotatable with the toothed wheel 7. The cams 15 and 16 are substantially of the mutually integral construction. The first cam 15 has a cam face of gradually varying radius terminating in a maximum radius portion 15a. The second cam 16 has a generally circular configuration, but is formed with a radially outwardly projecting lug 17 located approximately 90° ahead of the maximum radius portion 15a of the first cam 15 in the direction of its rotation indicated by an arrow A.

Figure 2:
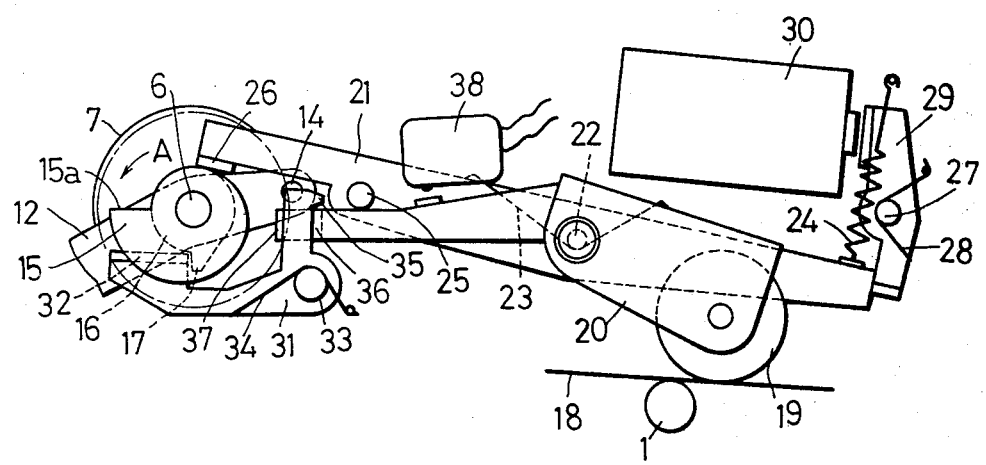
FIG. 2 is a front elevational view of fragmentarily showing the preferred embodiment of this invention in its inoperative position.
Figure 3:
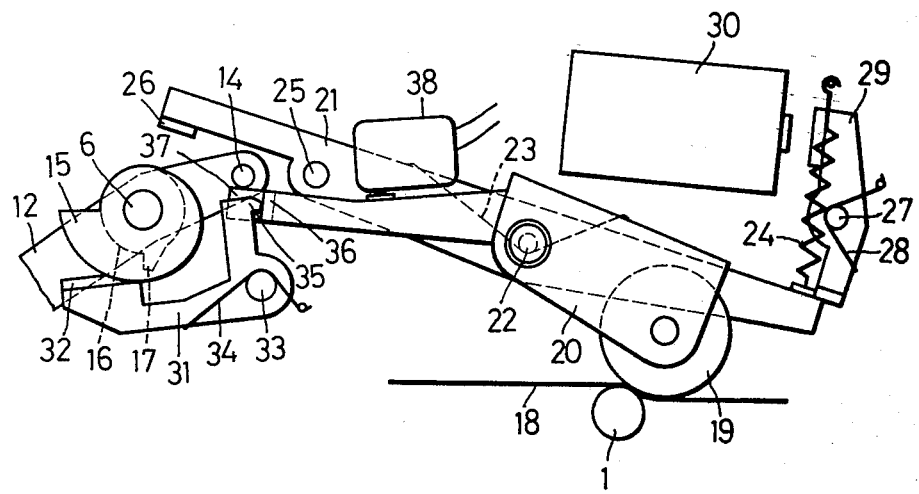
FIG. 3 is a view similar to FIG. 2, showing the device in its operative position.

Referring now to FIGS. 2 and 3, a pinch roller 19, which is adapted to press the film 18 against the capstan 1 as well known in the art, is rotatably supported on a pinch roller lever 20 which is, in turn, rotatably carried on a shaft 22. The shaft 22 also rotatably supports another lever 21 thereon. A spring 23 has one end engaged with the lever 20 and another end engaged with the lever 21. The spring 23 is engaged with the shaft 22 intermediate the ends thereof to urge the levers 20 and 21 toward each other as shown in FIG. 2. A spring 24 has one end fastened to one end of the lever 21 and another end appropriately fastened to the cinecamera casing to urge the lever 21 counterclockwise as viewed in FIG. 2. The lever 21 is formed with a pin 25 toward another end thereof to the opposite side of the shaft 22 from the spring 24. By virtue of the action of the spring 24, the pin 25 on the lever 21 stays in abutment on the lever 20 as shown in FIG. 2 when the cinecamera is not in use. The lever 21 is formed at the other end thereof with a lug 26 which is engageable with the cam 15. A latching lever 29 is mounted rotatably on a shaft 27 adjacent to the one end of the lever 21 for latching engagement with the lever 21 as shown in FIG. 3. A spring 28 has one end engaged with the latching lever 29 and another end appropriately anchored to the cinecamera casing. The spring 28 is engaged with the shaft 27 intermediate the ends thereof to urge the lever 29 clockwise as viewed in FIG. 2. The latching lever 29 is engageable at one end with the lever 21 to latch it in position by virtue of the action of the spring 28, and an electromagnet 30 is provided adjacent to another end of the lever 29 to pull it counterclockwise when energized, against the action of the spring 28 to unlatch the lever 29 from the lever 21 as shown in FIG. 2.

The pinch roller lever 20 rotatably supports the pinch roller 19 at one end thereof and has another end extending beyond the pin 25 on the lever 21 and terminating in the vicinity of the pin 14 on the lever 12. A generally L-shaped lever 31 is mounted rotatably on a shaft 33 in the vicinity of the other end of the pinch roller lever 20 and the cams 15 and 16. The lever 31 is formed at one end with a lug 32 which is engageable with the cam 16. A spring 34 has one end engaged with the lever 31 and another end appropriately anchored to the cinecamera casing. The spring 34 is engaged with the shaft 33 intermediate the ends thereof to urge the lever 31 clockwise as viewed in FIG. 2 to engage its lug 32 with the cam 16 as shown in FIG. 2. The lever 31 is provided at another end thereof with a latching pawl 35 which is engageable with a lug 36 formed on the other end of the pinch roller lever 20 to latch the lever 20 in its inoperative position as shown in FIG. 2. The other end of the pinch roller lever 20 further includes a tongue 37 facing the pin 14 on the lever 12 and which is capable of abutment on the pin 14 as shown in FIG. 3. A microswitch 38 is mounted in the vicinity of the pinch roller lever 20. In the operative position of the lever 20 in which the pinch roller 19 presses the film 18 against the capstan 1 as shown in FIG. 3, the microswitch 38 is closed by the lever 20 to actuate a film driving motor 44 (FIG. 4) to operate an intermittent film driving mechanism as will hereinafter be described in further detail.

Figure 4:
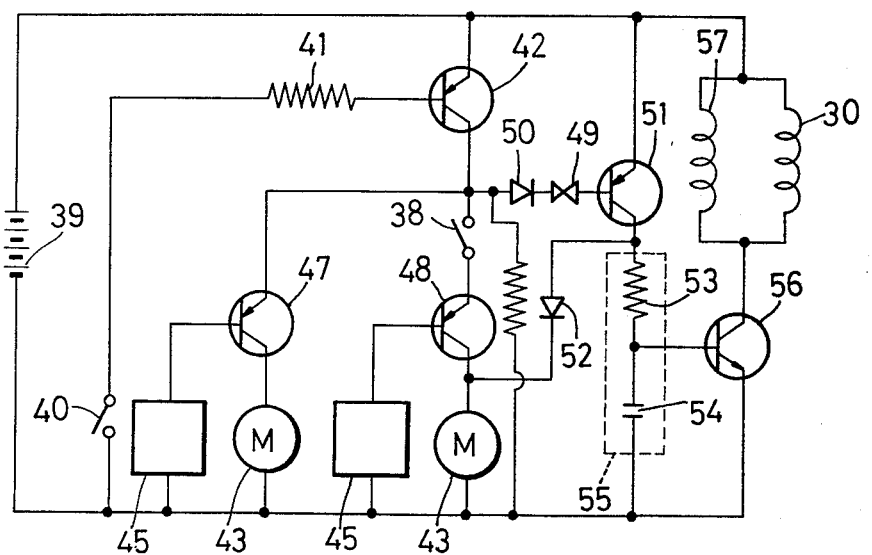
FIG. 4 illustrates a typical electrical diagram for a cinecamera in which the device of this invention is incorporated.

Reference is now made to FIG. 4 illustrating an electrical diagram for the apparatus of this invention. The electrical circuit includes a battery assembly 39 designed to power the entire circuit and which may usually be rated at 6 V or 9 V. A main switch 40 is electrically connected with the battery assembly 39 and adapted for closing upon depression of a release button on the cinecamera to transmit an electric current to a switching transistor 42 through a resistance 41 to thereby establish circuit continuity through the transistor 42. The switching transistor 42 is adapted to actuate the film driving motor 44 through the capstan driving motor 43 and the microswitch 38. A speed control device 45 is provided to control the operating speed of the capstan driving motor 43 through a transistor 47. Likewise, a speed control device 46 is provided to control the operating speed of the film driving motor 44 through a transistor 48. Each of the speed control devices 45 and 46 may, for example, comprise a generator in a well known manner. A transistor 51 has an input electrically connected to the switching transistor 42 through a shutter contact 49 and a constant-voltage element 50. The shutter contact 49 is a well known element operable with rotation of a shutter on the cinecamera. The output of the transistor 51 is electrically connected to the film driving motor 44 through a diode 52, and also to the base of a transistor 56 through a known time constant circuitry 55 which comprises a resistance 53 and a condenser 54. The output of the transistor 56 is electrically connected to an electromagnet 57 which is adapted to actuate a known shutter stop to stop the shutter in a desired position. The electromagnet 30 of FIGS. 2 and 3 is connected in parallel with the electromagnet 57.

In operation, the main switch 40 is closed upon depression of the release button to establish circuit continuity through the switching transistor 42, whereby the capstan driving motor 43 is placed into operation. The film driving motor 44 stays inoperative because the microswitch 38 is open. The rotation of the motor 43 is transmitted to the flywheel 2 through the pulley 4 and the belt 3 to thereby rotate the capstan 1. But as long as the pinch roller 19 stays away from the capstan 1 as shown in FIG. 2, no movement of the film 18 takes place.

Upon rotation of the flywheel 2, the toothed wheel 5 on the flywheel 2 is also rotated. The rotation of the toothed wheel 5 is transmitted through the toothed wheels 8 to 11 on the lever 12 to the toothed wheel 7 to rotate the toothed wheel 7 in the direction of the arrow A. Upon rotation of the toothed wheel 7, the cams 15 and 16 are also rotated in the direction of the arrow A. With the rotation of the first cam 15 in FIG. 2, the lever 21 is rotated clockwise about the shaft 22 against the action of the spring 24. About 270° of rotation of the cam 15 causes its maximum radius portion 15a to rest against the lug 26 on the lever 21, whereupon the latching lever 29 is caused to move clockwise about the shaft 27 and slip into latching engagement with the lever 21 under the action of the spring 28 to latch the lever 21 in the position of FIG. 3. The clockwise rotation of the lever 21 imparts to the spring 23 an increased force which tends to rotate the pinch roller lever 20 clockwise, but the lever 20 does not effect clockwise rotation, because its lug 36 is engaged by the latching pawl 35 on the L-shaped lever 31. Thus, the pinch roller 19 still remains in its inoperative position spaced away from the capstan 1 as shown in FIG. 2.

After the lever 21 is latched in its clockwise rotated position, the cams 15 and 16 further continue rotation in the direction of the arrow A. When the cams 15 and 16 have approximately completed a full rotation about the shaft 6, the lug 17 on the second cam 16 abuts on the lug 32 on the lever 31 and swings the lever 31 counterclockwise instantaneously against the action of the spring 34, whereupon the latching pawl 35 on the lever 31 is disengaged from the lug 36 on the lever 20. Upon this disengagement, the spring 23 causes clockwise rotation of the pinch roller lever 20, whereby the pinch roller 19 presses the film 18 against the capstan 1 as shown in FIG. 3 to permit the capstan 1 to advance the film 18 at a constant speed. The clockwise rotation of the lever 20 also effects closure of the microswitch 38 as illustrated in FIG. 3, so that the switching transistor 42, through which circuit continuity is already present, transmits an electric current to the film driving motor 44 to permit it to drive the film 18 intermittently.

The clockwise rotation of the pinch roller lever 20 further causes abutment of its tongue 37 against the pin 14 on the lever 12 to rotate the lever 12 counterclockwise about the shaft 6. Upon such rotation of the lever 12, the toothed wheel 8 on the lever 12 is disengaged from the toothed wheel 5 on the flywheel 2 to discontinue transmission of rotation from the flywheel 2 to the toothed wheel 7 and the cams 15 and 16. By virtue of the inertia built in the transmission system (namely, a chain of the toothed wheels 8 through 11 and 7), however, the cams 15 and 16 continue rotation to a certain extent until they return to their initial positions shown in FIG. 3. Thus, it will be noted that after the pinch roller 19 is displaced into pressure contact with the capstan 1, the relative positions of the various levers are maintained as shown in FIG. 3 to effect continued advancement of the film 18 at a constant speed, as long as the release button remains depressed.

When the depression of the release button is discontinued, the main switch 40 is opened to break circuit continuity through the switching transistor 42, whereby application of an electric current to the capstan driving motor 43 and the film driving motor 44 is discontinued. The constant-voltage element 50 prevents establishment of circuit continuity through the transistor 51 while circuit continuity is present through the switching transistor 42, but as soon as the circuit continuity through the switching transistor 42 is broken, the base current flowing through the shutter contact 49, the constant-voltage element 50, the microswitch 38 and the film driving motor 44 establishes circuit continuity through the transistor 51. When circuit continuity is established through the transistor 51, an electric current flows through the transistor 51 and the diode 52 to the film driving motor 44 to effect continued rotation of the motor 44. Also, circuit continuity is established through the transistor 51, the time constant circuitry 55 and the transistor 56 to energize the electromagnet 57. Upon energization, the electromagnet 57 causes the shutter stop to act on the shutter to stop the shutter at a desired position and simultaneously, the shutter contact 49 is opened, whereupon the base current ceases to flow through the transistor 51. As the circuit continuity through the transistor 51 is thus broken, the transmission of an electric current through the diode 52 to the film driving motor 44 is discontinued and after a certain length of delay by the time constant circuitry 55, the circuit continuity through the transistor 56 is broken to deenergize the electromagnet 57.

With the energization of the electromagnet 57, the electromagnet 30 is also energized to pull the latching lever 29 in a counterclockwise direction as viewed in FIG. 3 against the action of the spring 28 to release the lever 29 from latching engagement with the lever 21. The lever 21 is rotated back counterclockwise into its position shown in FIG. 2 under the action of the spring 24. During the counterclockwise rotation of the lever 21 about the shaft 22, the pin 25 on the lever 21 abuts on the pinch roller lever 20 to rotate it counterclockwise about the shaft 22. This rotation of the lever 20 causes the latching pawl 35 on the lever 31 to catch the lug 36 on the lever 20 to hold the lever 20 against clockwise rotation as shown in FIG. 2. Thus, the pinch roller 19 is kept away from the capstan 1 as shown in FIG. 2. In this position of the pinch roller lever 20 shown in FIG. 2, the microswitch 38 is opened and also, the tongue 37 on the lever 20 is spaced away from the pin 14 on the lever 12, so that the lever 12 is rotated back clockwise about the shaft 6 under the action of the spring 13 to engage the toothed wheel 8 on the lever 12 with the toothed wheel 5 on the flywheel 2 to effect transmission of rotary motion from the flywheel 2 to the cams 15 and 16 again.

While the invention has herein been described with reference to a preferred embodiment thereof, it is to be understood that modifications or variations may be easily made by those skilled in the art without departing from the spirit and scope of this invention defined by the appended claims.

What is claimed is:

1. A pinch roller moving device for a simultaneous image and sound recording cinecamera having a capstan, a pinch roller movable into contact with said capstan to advance continuously a film having a sound recording track along one longitudinal edge thereof, means for driving said film intermittently, an electric motor for driving said capstan and an electric motor for driving said intermittent film driving means, said device comprising:

- a rotatable lever on which said pinch roller is rotatably and transversely movably supported;
- rotary means rotatable upon rotation of said capstan driving motor; and
- means for transmitting said rotation of said capstan driving motor to said rotary means to rotate said lever to move said pinch roller transversely to press said film against said capstan;
- said capstan driving motor being actuatable upon depression of a cinecamera release button.

2. The device as defined in claim 1, further including a switch provided between a power source and said intermittent film driving motor for closure by said lever upon said rotation thereof.

3. The device as defined in claim 1, wherein said rotary means comprises a cam.

4. The device as defined in claim 1, further including:
- a second rotatable lever having an axis of rotation on the axis of rotation of said first mentioned lever; and
- a spring connected between said first and second levers;
- said second lever being rotatable upon rotation of said rotary means to assist said rotation of said first lever to effect said transverse movement of said pinch roller toward said capstan.

5. The device as defined in claim 4, further including means for discontinuing said transmission of said rotation of said capstan driving motor upon said rotation of said second lever.

6. The device as defined in claim 4, further including:
- a second rotary means mounted coaxially with said first mentioned rotary means; and
- a third rotatable lever positively engageable with said first mentioned lever to maintain it against said rotation thereof, said third lever being rotatable upon rotation of said second rotary means to release said positive engagement with said first lever.

7. The device as defined in claim 6, wherein said first mentioned rotary means comprises a first basically circular cam of varying radius and said second rotary means comprises a second generally circular cam of varying radius rotatable with said first cam and having an angular point at which said second cam has its maximum radius and which is located ahead, in the direction of rotation of said cams, of the angular point of said first cam which defines the maximum radius of said first cam.

8. The device as defined in claim 7, wherein said angular point of said first cam is normally spaced at a predetermined angular distance from that portion of said first cam at which said first cam contacts prior to said rotation of said second lever.

9. The device as defined in claim 6, further including a fourth lever resiliently rotatable into latching engagement with said second lever upon said rotation of said third lever.

10. The device as defined in claim 9, further including means provided in the vicinity of said fourth lever for disconnecting said latching engagement, said disconnecting means being operable upon discontinuation of said release button depression.

11. The device as defined in claim 10, wherein said disconnecting means comprises an electromagnet.

12. The device as defined in claim 1, wherein said transmitting means comprises:
- a toothed wheel coaxially supported with said capstan;
- a lever;
- a shaft on which said last mentioned lever is rotatably supported; and
- a chain of toothed wheels rotatably supported on said last mentioned lever, including one rotatably supported on said last mentioned shaft, said chain of toothed wheels being engageable with said first mentioned toothed wheel, said rotary means being supported on said last mentioned shaft.

13. The device as defined in claim 12, further including means provided on said last mentioned lever and engageable by said first mentioned lever for releasing said chain of toothed wheels from said engagement with said first mentioned toothed wheel upon said rotation of said first mentioned lever.

* * * * *